United States Patent
Fujita (10) Patent No.: US 6,681,651 B2
(45) Date of Patent: Jan. 27, 2004

(54) BALL SCREW

(75) Inventor: Satoshi Fujita, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/898,459

(22) Filed: Jul. 5, 2001

(65) Prior Publication Data

US 2002/0026844 A1 Mar. 7, 2002

(30) Foreign Application Priority Data

Jul. 18, 2000 (JP) ........................................ 2000-216863

(51) Int. Cl.[7] .............................................. F16H 25/22
(52) U.S. Cl. ................................. 74/424.86; 74/424.87; 74/424.82
(58) Field of Search ....................... 74/424.82, 424.84, 74/424.85, 424.86, 424.87

(56) References Cited

U.S. PATENT DOCUMENTS

| | | | | |
|---|---|---|---|---|
| 2,851,897 A | * | 9/1958 | Cochrane | 74/424.87 |
| 2,995,947 A | * | 8/1961 | Grabowski | 74/424.87 |
| 5,063,809 A | | 11/1991 | Schlenker | 74/459 |
| 5,373,755 A | * | 12/1994 | Rohlinger | 74/424.86 |
| 5,622,082 A | * | 4/1997 | Machelski | 74/424.86 |
| 5,664,459 A | * | 9/1997 | Muhleck et al. | 74/424.87 |
| 5,791,192 A | * | 8/1998 | Lee | 74/424.87 |
| 5,988,007 A | * | 11/1999 | Nishimura | 74/424.87 |

FOREIGN PATENT DOCUMENTS

| | | |
|---|---|---|
| EP | 0 418 999 A1 | 3/1991 |
| WO | WO 99/06740 | 2/1999 |

OTHER PUBLICATIONS

*Abstract Only* of Japanese Patent Application No. 11-149430, Misu Hiroshi, Dec. 5, 2000.

* cited by examiner

*Primary Examiner*—David A. Bucci
*Assistant Examiner*—Justin Stefanon
(74) *Attorney, Agent, or Firm*—Arent Fox Kintner Plotkin & Kahn, PLLC (57) ABSTRACT

There is provided a return pipe type ball screw capable of accurately positioning and fixing return pipes on and to a nut member even when a troublesome positioning operation is not carried out, and circulating balls endlessly and smoothly for a long period of time without the possibility that dust enters the interior of the nut member. In such a ball screw, ball passing holes formed so as to extend through the nut member are inclined at an angle equal to a lead angle of a ball rolling groove of a screw shaft, and each of the return pipes is formed by combining together a pair of return pieces adapted to be fitted in the ball passing holes.

5 Claims, 14 Drawing Sheets

＃ BALL SCREW

BACKGROUND OF THE INVENTION

1. Field of the Invention

This invention relates to a ball screw which has a nut member engaged with a screw shaft via balls, and which is adapted to convert a rotational movement of a motor into a linear movement in a work table of, for example, a machine tool, and more particularly to an improvement in a ball screw of the type which has an endless ball circulating passage formed by fixing substantially U-shaped return pipes to the nut member.

2. Description of the Related Art

Figure 14:
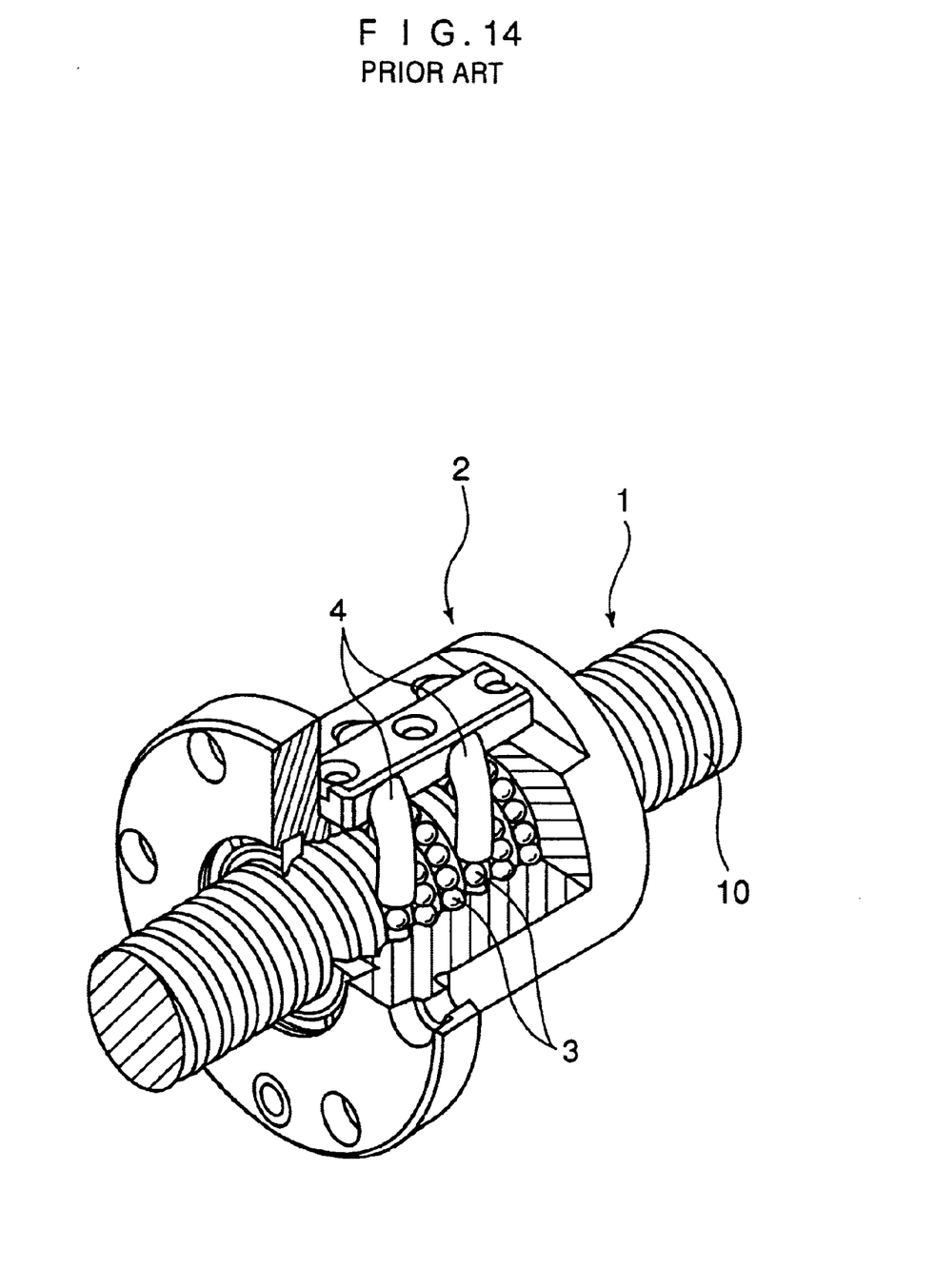
FIG. 14 is a perspective view showing a related art ball screw.

Various types of ball screws having an endless ball circulating passage formed by using so-called return pipes are known. These ball screws, as shown in FIG. 14, are provided with a screw shaft 1 having a helical ball rolling groove 10, a nut member 2 having a helical loaded rolling groove opposed to the ball rolling groove 10 and engaged with the screw shaft 1 via balls 3, and return pipes fixed to the nut member 2 and forming an endless circulating passage for the balls 3.

Figure 15:
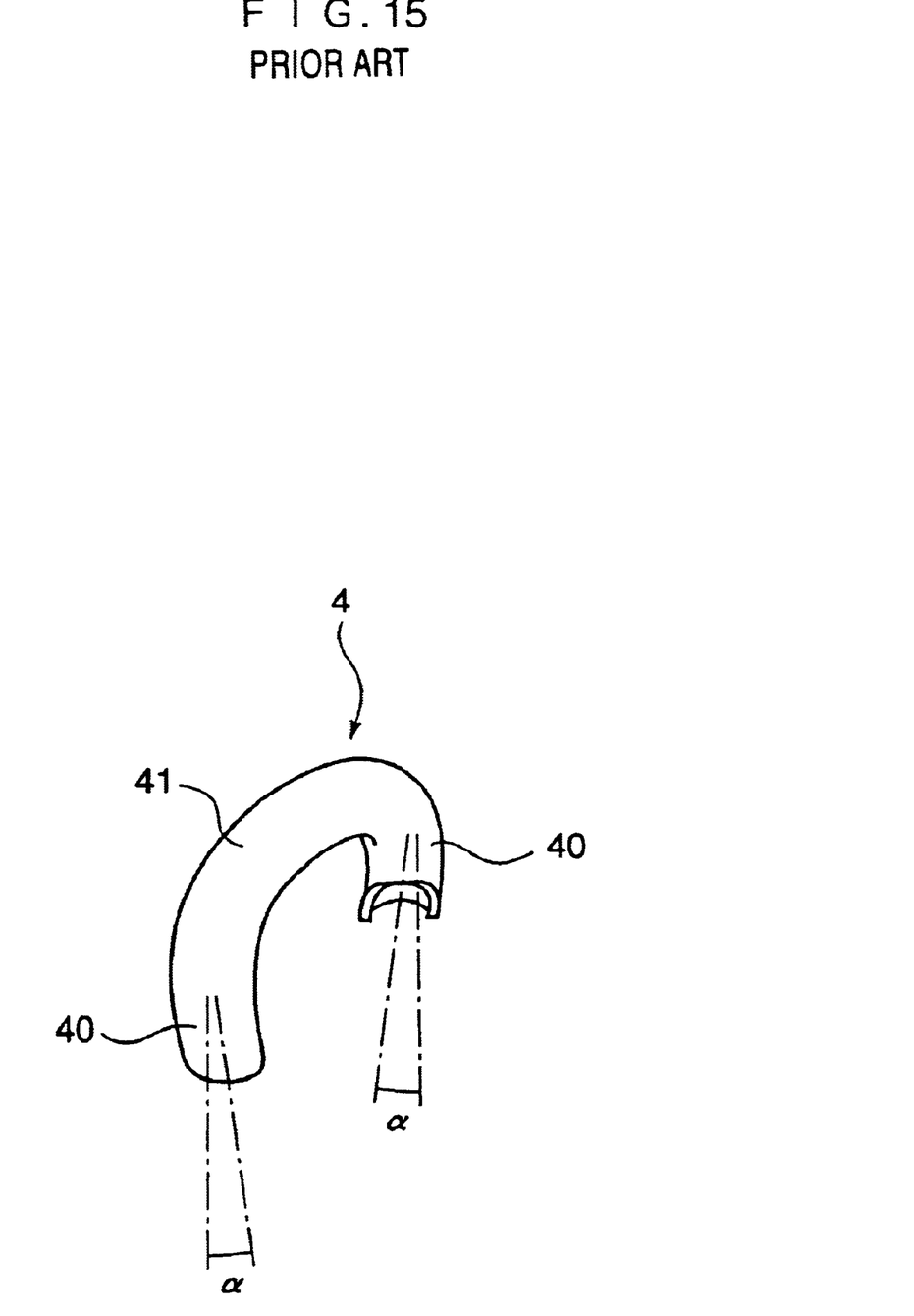
FIG. 15 is a perspective view showing a return pipe in the related art ball screw.

As shown in FIG. 15, each of such return pipes 4 is formed to a substantially U-shaped cross section, and provided with a pair of leg portions 40 inserted into the nut member 2, and a communication passage portion 41 connecting these leg portions 40 together so that balls 3 can roll in the interior thereof from one leg portion 40 toward the other 40. The nut member 2 is provided with pairs of ball passing holes used to insert the leg portions 40 of the return pipes 4 thereinto, in such a manner that each pair of ball passing holes sandwich the axis of the nut member 2 therebetween. These ball passing holes are formed tangentially with respect to an inner circumferential surface of the nut member. These ball passing holes are formed at intervals of several turns of the loaded rolling groove. The return pipes 4 are formed so that, when the leg portions 20 thereof are inserted into these ball passing holes, the leg portions 20 slightly project into the inner circumferential surface of the nut member 2 and scoop up the balls 3 from the ball rolling groove 10 of the screw shaft 1 into the interior of the return pipes 4. Therefore, when the balls 3 which have rolled as they impart a load to the screw shaft 1 between the ball rolling groove 10 of the screw shaft 1 and loaded rolling groove of the nut member 2 reach the positions in which the leg portions 40 of the return pipes 4 project, the balls 3 are released from the load and leave the ball rolling groove 10 of the screw shaft 1. The balls 3 then roll in an unloaded condition in the interior of the return pipes 4, and are returned to the portions of the ball rolling groove 10 which are several turns backward. Namely, when the return pipes 4 are fixed to the nut member 2, an endless circulating passage for the balls 3 is formed.

In an effective method of smoothly scooping the balls from the ball rolling groove of the screw shaft into the return pipes, the balls are scooped up in the ball rolling direction, i.e., in the direction in which the helical ball rolling groove is stretched radially. In order to practice this method, it is necessary that the leg portions 40 of the return pipes 4 be inclined as shown in FIG. 15 from the cross sections thereof which are perpendicular to the screw shaft toward the axis of the screw shaft by an angle equal to a lead angle α of the ball rolling groove 10. Since the return pipes 4 are fixed to the nut member 2 so as to stride over the axis of the same, it is necessary that the directions in which each pair of leg portions 40 are inclined at an angle equal to a lead angle α of the ball rolling groove 10 be opposite to each other, i.e., it is necessary that each pair of leg portions 40 be formed at both ends of the relative communication passage portion 41 so as to be in a twisted state with respect to each other and not in a parallel-extending state.

However, in view of the shape of the return pipes in the related art ball screw, it is physically difficult to insert the leg portions of the return pipes in order into the ball passing holes of the nut member. The inserting of each pair of leg portions into the ball passing holes had to be done at the same time by bringing each return pipe close to the nut member in the direction (from an upper portion of FIG. 14) perpendicular to the axis of the nut member. In order to practice this method, it is necessary that the ball passing holes into which the leg portions of the return pipes are inserted of the nut member be formed perpendicularly with respect to the axis of the nut member. Since the leg portions of the return pipes are inclined at an angle equal to the lead angle of the ball rolling groove, an inner diameter of the ball passing holes had to be set larger than an actual outer diameter of the return pipes.

Therefore, in the related art ball screw, the return pipes cannot be positioned accurately by merely inserting the leg portions thereof into the ball passing holes of the nut member. It was necessary that the return pipes were positioned manually as the balls were rolled in practice after the leg portions had been inserted into the ball passing holes. Moreover, since the inner diameter of the ball passing holes is larger than the outer diameter of the return pipes, there is a fear that dust enter the clearances between these holes and pipes to cause the smooth circulation of the balls to be early spoiled.

The inner circumferential surface of the nut member is provided with a loaded rolling groove formed at a predetermined lead angle. Therefore, when ball passing holes of a large inner diameter are made in the direction perpendicular to the axis of the nut member, there is a fear that such ball passing holes interfere with adjacent portions of the loaded rolling groove. Especially, when a lead length of this rolling groove was small with the diameter of the balls large, it was difficult to form the ball passing holes.

SUMMARY OF THE INVENTION

The present invention has been made in view of the above circumstances, and provides a return pipe type ball screw capable of accurately positioning and fixing return pipes on and to a nut member even when a troublesome positioning operation is not carried out, and circulating balls smoothly and endlessly for a long period of time without the possibility that dust enters the interior of the nut member.

The present invention also provides a ball screw capable of circulating balls endlessly through return pipes even when a lead length of a helical ball rolling groove is small with a diameter of the endlessly circulating balls large.

The ball screw according to the present invention includes a screw shaft provided with a helical ball rolling groove having a predetermined lead angle; a nut member having a through hole through which the screw shaft is passed, and a helical loaded rolling groove formed in an inner circumferential surface of the through hole, opposed to the ball rolling groove and engaged with the screw shaft via plural balls rolling in the ball rolling groove and loaded rolling groove; a pair of ball passing holes formed so as to extend through the nut member, each of which is joined to opposed side portions of the loaded rolling groove; and a return pipe having a pair of leg portions inserted into relative pair of ball passing holes, and fixed to the nut member so as to form an endless ball circulating passage, wherein the ball passing holes are formed so as to incline from the cross sections thereof which are perpendicular to the axis of the screw shaft in the axial direction of the screw shaft by an angle equal to the lead angle of the ball rolling groove of the screw shaft, the return pipe has a pair of return pieces adapted to be fitted in relative ball passing holes.

In the ball screw according to the present invention, the ball passing holes formed in the nut member so as to make the balls, which have rolled as they impart a load to the screw shaft between the loaded rolling groove of the nut member and ball rolling groove of the screw shaft, enter the return pipes smoothly are inclined from cross sections thereof which are perpendicular to the axis of the screw shaft in the axial direction thereof at an angle equal to the lead angle of the ball rolling groove of the screw shaft. Since each of the return pipes is formed by combining therewith a pair of return pieces adapted to be fitted in the relative ball passing holes, the return pieces can be inserted and fixed separately in and to the ball passing holes of the nut member. Therefore, the ball passing holes of the nut member into which the return pieces are inserted may have an inner diameter equal to the outer diameter of the return pieces, and such return pieces can be positioned accurately by merely inserting the same into the ball passing holes of the nut member. The ball passing holes of the nut member may be formed to a size which enables the return pieces to be fitted therein without causing a clearance to occur between the holes and return pieces. Since a clearance does not occur between such ball passing holes and return pieces, the entry of dust into the interior of the nut member can be prevented.

The ball passing holes made in the nut member may have a size large enough to enable the return pieces to be fitted therein without causing a clearance to occur between these holes and return pieces. Therefore, the ball passing holes do not interfere with adjacent portions of the loaded rolling groove, and, even when a lead length of the ball rolling groove is small with the diameter of the balls large, an endless ball circulating passage can be formed by the return pipes.

As described above, in the ball screw according to the present invention, the pairs of ball passing holes in the nut member are formed so as to incline in the axial direction of the nut member by an angle equal to the lead angle of the ball rolling groove, and each of the return pipes inserted into the relative ball passing holes is formed by combining a pair of return pieces therewith. Therefore, the ball passing holes in the nut member into which these return pieces are inserted serve the purpose when these holes have an inner diameter equal to the outer diameter of the return pieces. The return pieces can be accurately positioned by merely inserting the same into the ball passing holes separately. This enables the return pipes to be positioned and fixed accurately with respect to the nut member without carrying out a troublesome positioning operation. Since a clearance does not occur between the ball passing holes and return pieces, there is not a fear that dust enters the interior of the nut member, and the balls can be circulated endlessly and smoothly for a long period of time.

Since the ball passing holes made in the nut member may be set to a size large enough to enable the return pieces to be fitted therein without causing a clearance to occur between the same holes and return pieces, the ball passing holes do not interfere with adjacent portions of the loaded rolling groove. Even when the lead length of the ball rolling groove is small with the diameter of the endlessly circulating balls large, a ball screw can be formed by using a return pipe system.

DESCRIPTION OF THE PREFERRED EMBODIMENTS

The ball screw according to the present invention will now be described in detail on the basis of the attached drawings.

The ball screw according to the present invention includes just as a related art ball screw shown in FIG. 14 a screw shaft 1 having a helical ball rolling groove 10, a nut member 2 engaged with the screw shaft 1 via plural balls 3, and return pipes fixed to the nut member and forming an endless circulating passage for the balls.

Figure 1:
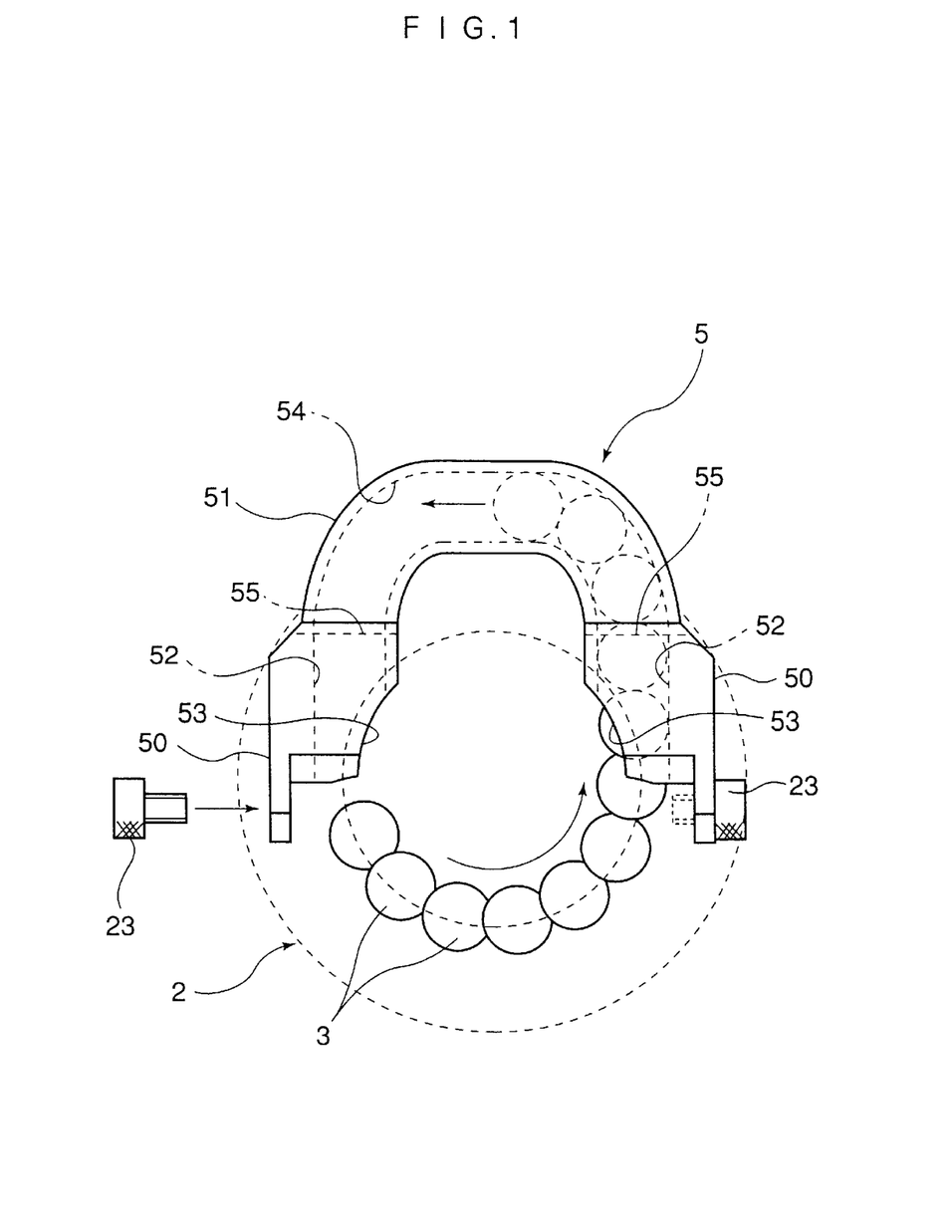
FIG. 1 shows the circulating condition of balls in a first embodiment of the ball screw according to the present invention.

FIG. 1 is a sectional view showing the condition of the endless circulating passage formed for the balls 3 in the ball screw according to the present invention. This ball screw is identical with a related art ball screw in that the endless circulating passage for the balls 3 is formed by fixing the return pipes 5 to the nut member 2. However, each of such return pipes 5 is formed of a pair of return pieces 50 directly positioned on and fixed to the nut member 2, and a communication passage piece 51 positioned on and fixed to the nut member 2. In this respect, the return pipe 5 is different from the return pipe 4, which is formed of a single U-shaped piece, in the related art screw shaft.

Figure 2:
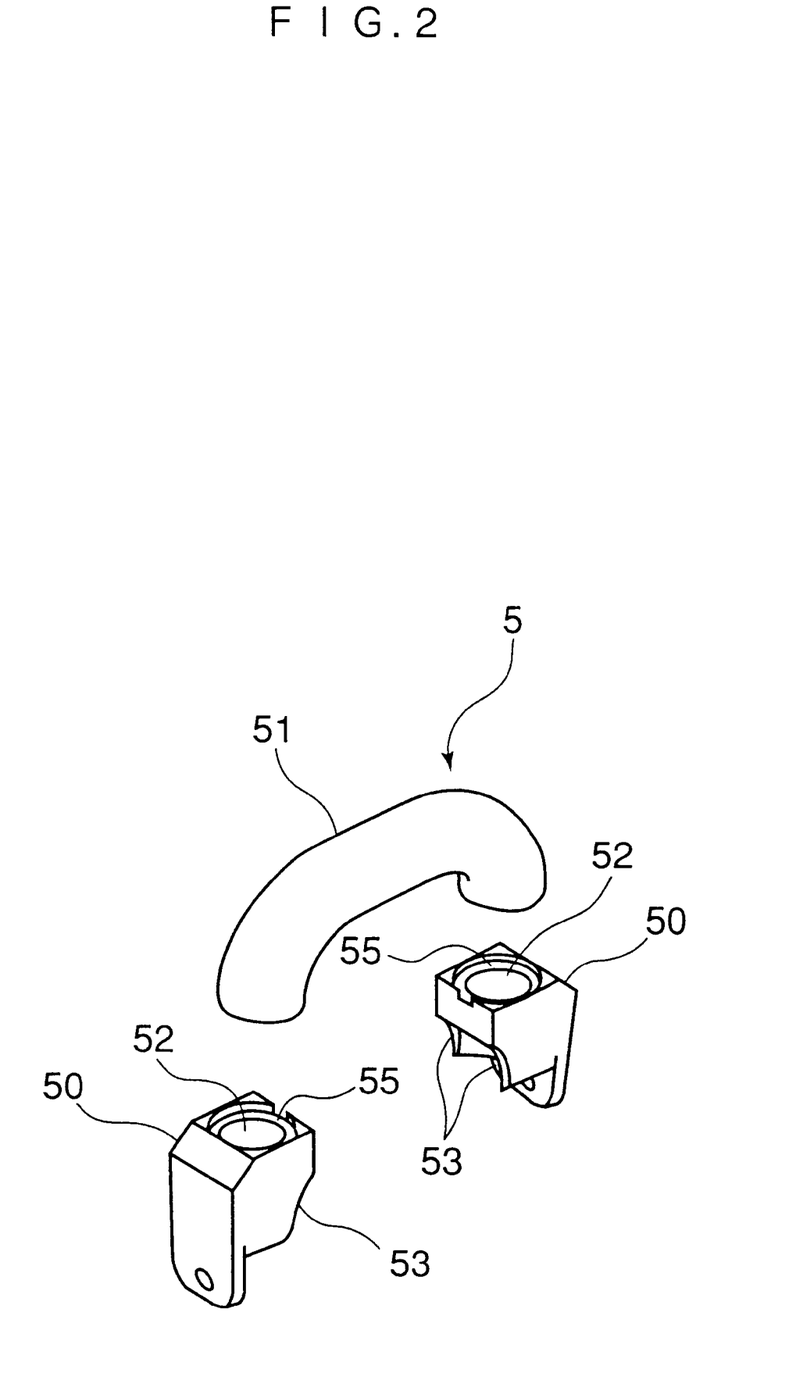
FIG. 2 is an exploded perspective view showing return pipes in the ball screw according to the present invention.

FIG. 2 is an exploded perspective view showing the return pipe 5. Each of the return pieces 50 has in an inner portion thereof a return passage 52 through which the balls 3 pass, and is formed rectangularly in external appearance so that the return piece is positioned easily with respect to the nut member 2 and fitted in the relative ball passing hole, which is made in the nut member 2, without causing a clearance to occur between the return piece and the same hole. When the rectangular return piece 50 is fitted in the ball passing hole of the nut member 2, parts thereof ought to project from an inner circumferential surface of the nut member 2 toward the screw shaft 1 but the projecting end portions are cut off arcuately so that the projecting end portions do not interfere with the screw shaft 1. These arcuately cut projecting end portions constitute scoop portions 53 for guiding the balls 3 rolling in the ball rolling groove 10 of the screw shaft 1 to the interior of the return passage 52. Since the scoop portions 53 are formed by arcuately cutting off the end portions of the through hole 52 which are on the side of the screw shaft 1, the width of an opening communicating with the through hole 52 gradually decreases. When a ball 3 reaches the scoop portions 53, it is lifted in both-sides-embraced state from the ball rolling groove 10 of the screw shaft 1 and roll into the through hole 52 of the return piece 50.

The communication passage piece 51 is formed substantially in the shape of the letter "U", through which a ball returning passage 54 is formed. Both ends of this communication passage piece 51 are joined to upper surfaces of the return pieces 50. The upper surfaces of the return pieces 50 are provided with annular grooves 55 in which the end surfaces of the communication passage piece 51 are fitted. Namely, the return pieces are formed so as to enable the communication passage piece 51 to be positioned accurately with respect to the return pieces 50, and the through holes 52 of the return pieces 50 and the ball returning passage 54 of the communication passage piece 51 to be joined together without causing a difference in height to occur at both ends of the communication passage piece 51.

Figure 3:
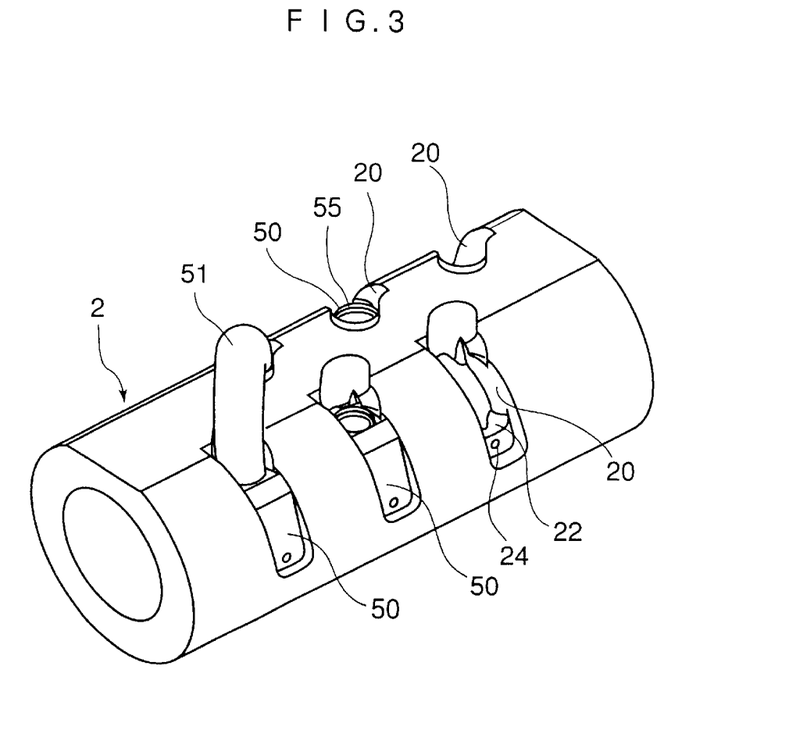
FIG. 3 is a perspective view showing a nut member of the ball screw according to the present invention.
Figure 4:
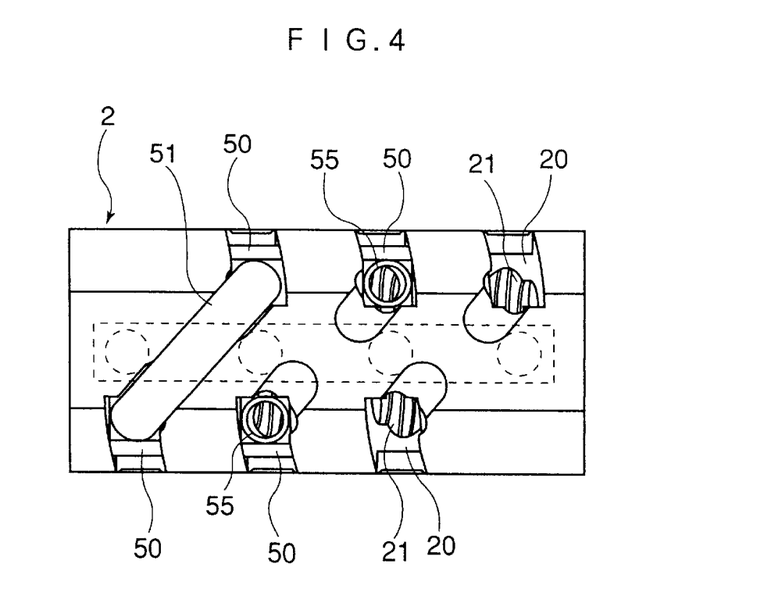
FIG. 4 is a plan view of the nut member shown in FIG. 3.

FIGS. 3 and 4 are perspective view and a plan view showing the condition of the return pieces 50 and communication passage pieces 51 which are fixed to the nut member 2. This nut member 2 is provided with three endless circulating passages for the balls 3, and, correspondingly to these endless circulating passages, three sets of return pipes 5 each of which includes return pieces 50 and communication passage piece 51 are fixed to the nut member 2. Referring to FIG. 4, in the endless circulating passage positioned on the extreme left side out of the three sets of endless ball circulating passages, return pieces 50 and a communication passage piece 51 are already fixed to the nut member 2. In a second endless circulating passage, only return pieces 50 are fixed to the nut member 2, and, in a third endless circulating passage, neither return pieces 50 nor a communication passage piece 51 is fixed to the nut member 2. As shown in these drawings, the nut member 2 is provided with ball passing holes 20 for fixing the return pieces 50 therein, and the return pieces 50 are positioned accurately on the nut member 2 by fitting the return pieces in the ball passing holes 20. The ball passing holes 20 are formed in the positions which are opposed to the loaded rolling groove for balls 3 which is formed in an inner circumferential surface of the nut member 2. Moreover, the ball passing holes are formed so as to extend through the outer and inner circumferential surfaces of the nut member 2. When a ball passing hole 20 is peeped into from the outer side of the nut member 2, a cross-sectional shape of the load rolling groove 21 formed in the inner circumferential surface of the nut member 2 is seen as shown in FIG. 4.

Figure 5:
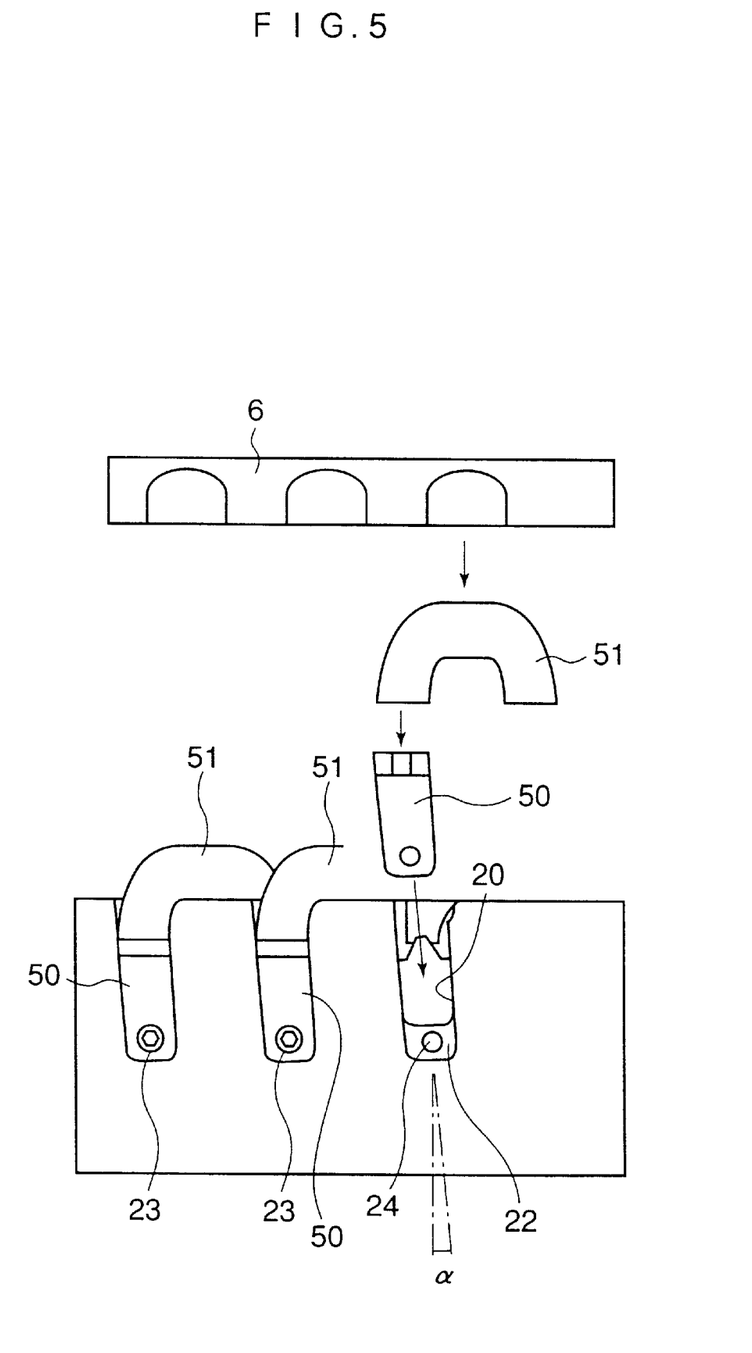
FIG. 5 is a side view showing how to fix return pieces and communication passage pieces to the nut member.

The inner surface of each of the ball passing holes 20 is inclined from a cross section thereof which is perpendicular to the axis of the screw shaft 1 in the axial direction thereof by an angle equal to a lead angle $\alpha$ of the load rolling groove 21, and each return piece 50 can be inserted into the relative ball passing hole 20 in the direction inclined at an angle equal to the lead angle $\alpha$ as shown in FIG. 5. Therefore, the inner surface of such a ball passing hole 20 is formed so that the return piece 50 is positioned with respect to the axial direction of the nut member 2. The ball passing hole 20 is provided therein with a stepped portion 22 for positioning the return piece 50 with respect to the radial direction of the nut member 2. Such a stepped portion 22 is provided with a tap hole 24 with which a fixing screw 23 is engaged. This structure enables such a return piece 50 to be positioned accurately with respect to the nut member 2 by fitting the return piece 50 in the ball passing hole 20 of the nut member 2, and then fastening the same with the fixing screw 23, and also the scoop portions 53 of the return piece 50 and the load rolling groove 21 of the nut member 2 to be opposed to each other accurately.

An upper surface of the return piece 50 joined to the communication passage piece 51 is formed so that the upper surface becomes parallel to the axis of the nut member 2 when the a return piece 50 is fitted in the ball passing hole 20 of the nut member 2. Therefore, when the return piece 50 is in a fixed state with respect to the nut member 2, it is possible to bring the communication passage piece 51 close to the nut member 2 in the direction perpendicular to the axis thereof, and fit an end opening of the communication passage piece 51 in the annular groove 55 of the return piece 50. This enables the communication passage piece 51 to be combined with a pair of return pieces 50, which are already fixed to the nut member 2, simultaneously and simply, and the through holes 52 of the return pieces 50 and the ball return passage 54 of the communication passage piece 51 to be joined to each other accurately. As shown in FIG. 5, a pipe holding member 6 is fixed from the upper side of the communication passage piece 51 onto the nut member 2, and the communication passage piece 51 is thereby fixed to the nut 2.

According to the ball screw thus constructed of the present invention, the return pieces 50 forming each return pipe 5 can be inserted into the ball passing holes 20 of the nut member 2 in the direction inclined at an angle equal to the lead angle $\alpha$ of the ball rolling groove 10. Therefore, the ball passing holes 20 have only to be formed to a diameter equal to that of the return pieces 50, and the return pieces 50 can be positioned accurately by only the operations for fitting the return pieces 50 into the ball passing holes 20. Since the return pieces 50 are provided with the scoop portions 53 for balls which extend in the direction inclined at an angle equal to the lead angle $\alpha$ of the ball rolling groove 10, it is possible to smoothly guide the balls 3 rolling in the ball rolling groove 10 of the screw shaft 1 into the through holes 52 of the return pieces 50.

Since the ball passing holes 20 of the nut member 2 are formed so as to incline at an angle equal to the lead angle $\alpha$ of the ball rolling groove 10, the interfering of the ball passing holes 20 with adjacent portions of the loaded rolling groove 21 by a distance corresponding to the width of one turn of the same groove 21 does not occur even when the diameter of the balls 3 rolling in the loaded rolling groove 21 is large. Even when the lead length of the ball rolling groove 10 is small with the diameter of the balls 3 large, an endless circulating passage for the balls 3 can be formed by a return pipe system.

Figure 6:
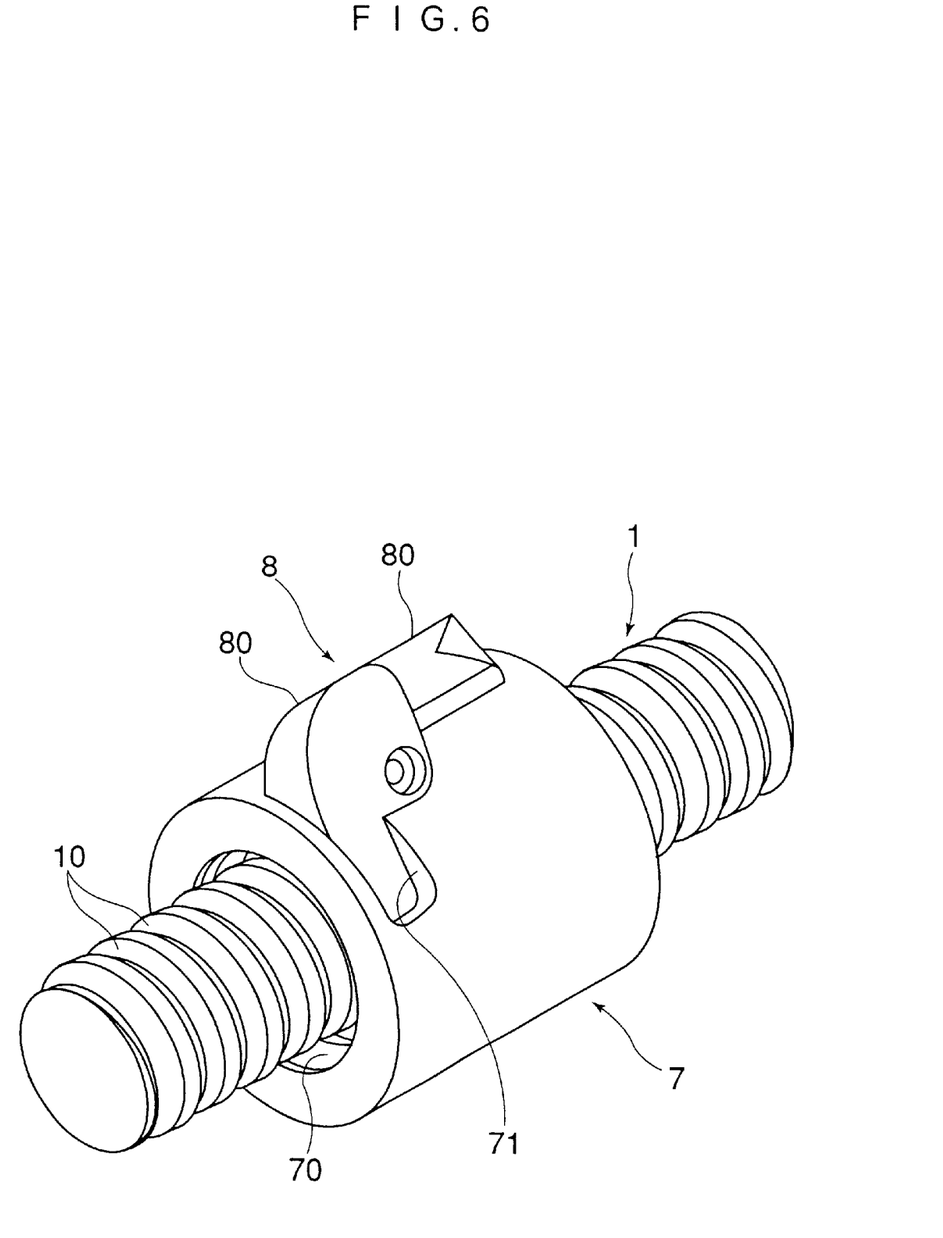
FIG. 6 is a perspective view showing a second embodiment of the ball screw according to the present invention.
Figure 7:
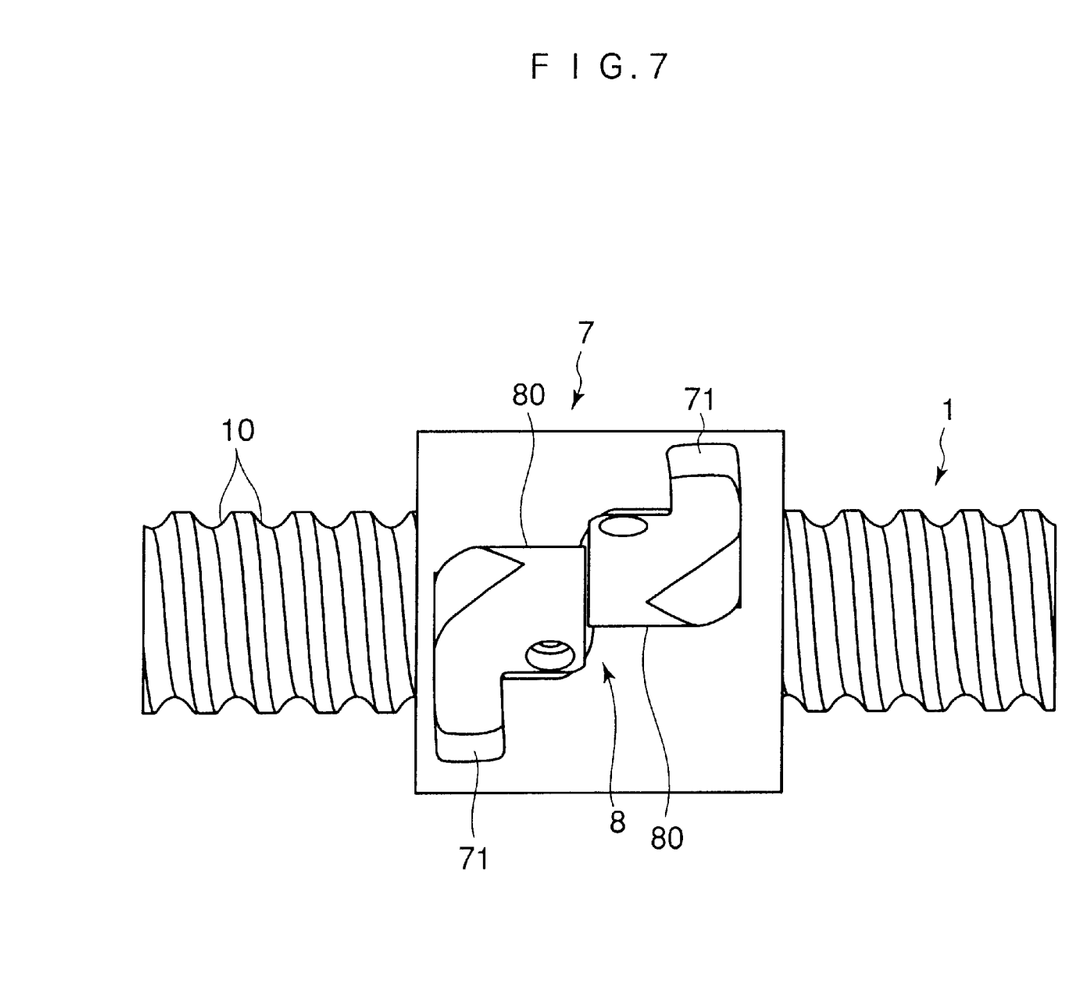
FIG. 7 is a plan view showing the ball screw of the second embodiment.

FIGS. 6 and 7 show a second embodiment of the ball screw to which the present invention is applied. This ball screw includes a screw shaft 1 having a helical ball rolling groove 10, a nut member 7 engaged with the screw shaft 1 via plural balls (not shown), and a return pipe 8 fixed to the nut member 7 and forming an endless ball circulating passage.

The nut member 7 is provided with a through hole 70 through which the screw shaft passes, and a clearance of a small width exists between an inner circumferential surface of the through hole 70 and an outer circumferential surface of the screw shaft 1. The inner circumferential surface of this through hole 70 is provided with a helical loaded rolling groove (not shown) in which the balls roll, and the loaded rolling groove is formed at a lead angle equal to that of the ball rolling groove 10 of the screw shaft 1. Accordingly, the ball rolling groove 10 of the screw shaft 1 and the loaded rolling groove of the nut member 7 are opposed to each other, and the balls are held between the ball rolling groove and loaded rolling groove and arranged helically in the clearance between the nut member 7 and screw shaft 1. When the screw shaft 1 is turned with respect to the nut member 7, the balls roll in the ball rolling groove 10 and loaded rolling groove while imparting a load thereto, and, in accordance with such actions of the balls, the nut member 7 is moved linearly in the axial direction along the circumference of the screw shaft 1.

Figure 8:
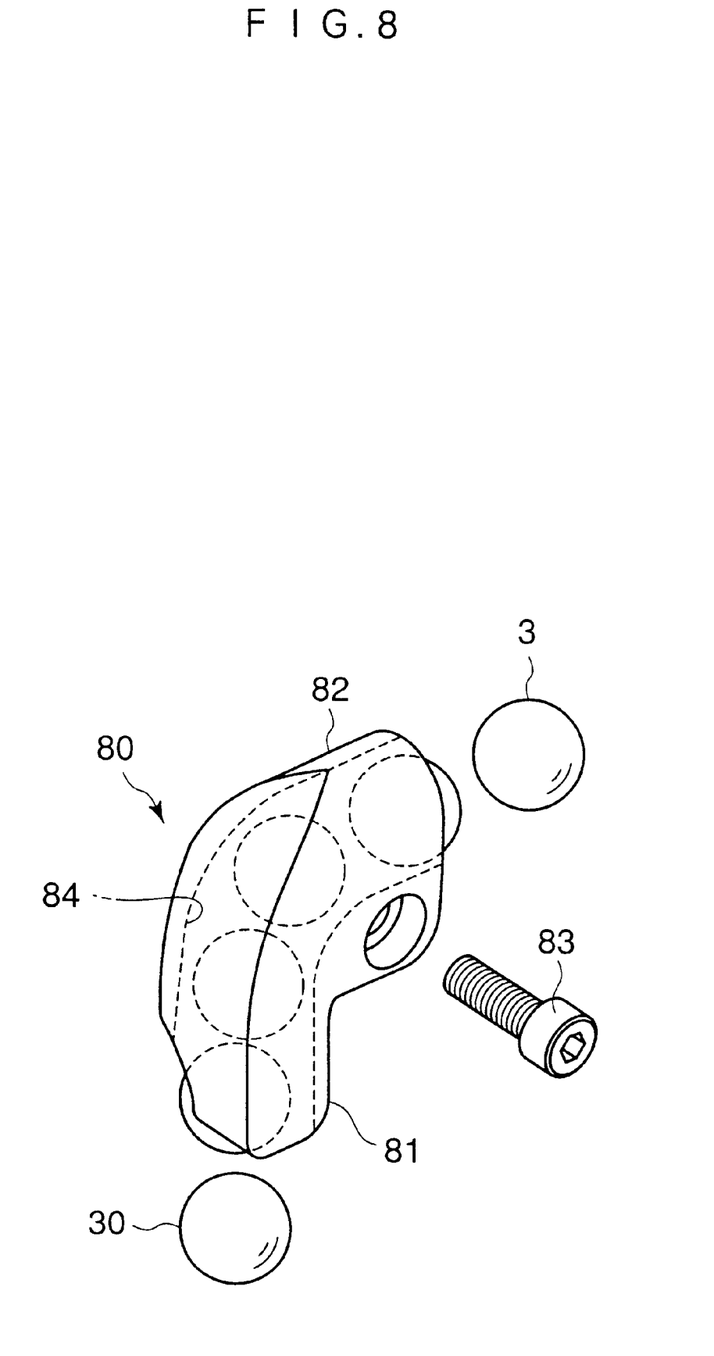
FIG. 8 is a perspective view showing a return piece in the second embodiment.

The return pipe 8 connects a terminal end portion and a starting end portion of the loaded rolling groove of the nut member 7 together, and thereby forms a circulating passage used to return the balls which reach the terminal end portion of the loaded rolling groove in accordance with the rotation of the screw shaft 1 to the starting end portion of thereof, and endlessly circulate the balls. The return pipe 8 in this embodiment includes a pair of return pieces 80, 80. FIG. 8 shows one 80 of the return pieces. The return piece 80 is formed substantially in the shape of the letter "L", and provided with a leg portion 81 inserted into the nut member 7, and a head portion 82 fixed to an outer circumferential surface of the nut member 7. The head portion 82 is fixed to the nut member 7 with a bolt 83 inserted through the head portion 82 and screwed to the nut member 7. The return piece 80 is provided with a return passage 84 having a diameter slightly larger than that of a ball 3, and formed in the shape of the letter "L" so that the balls 3 can be rolled freely in the return passage 84 without imparting a load thereto.

As shown in FIG. 7, the two return pieces 80 are fixed in an oppositely directed state to the nut member 7. Since these return pieces 80 are perfectly fixed to the nut member 7, the head portions 82 of the return pieces 80 contact each other without causing a clearance to occur therebetween, and openings on the side of the head portions 82 of the return passages 84 are joined to each other so that the balls 3 can be rolled continuously from the return passage 84 of one return piece 80 to that 84 of the other.

Figure 9:
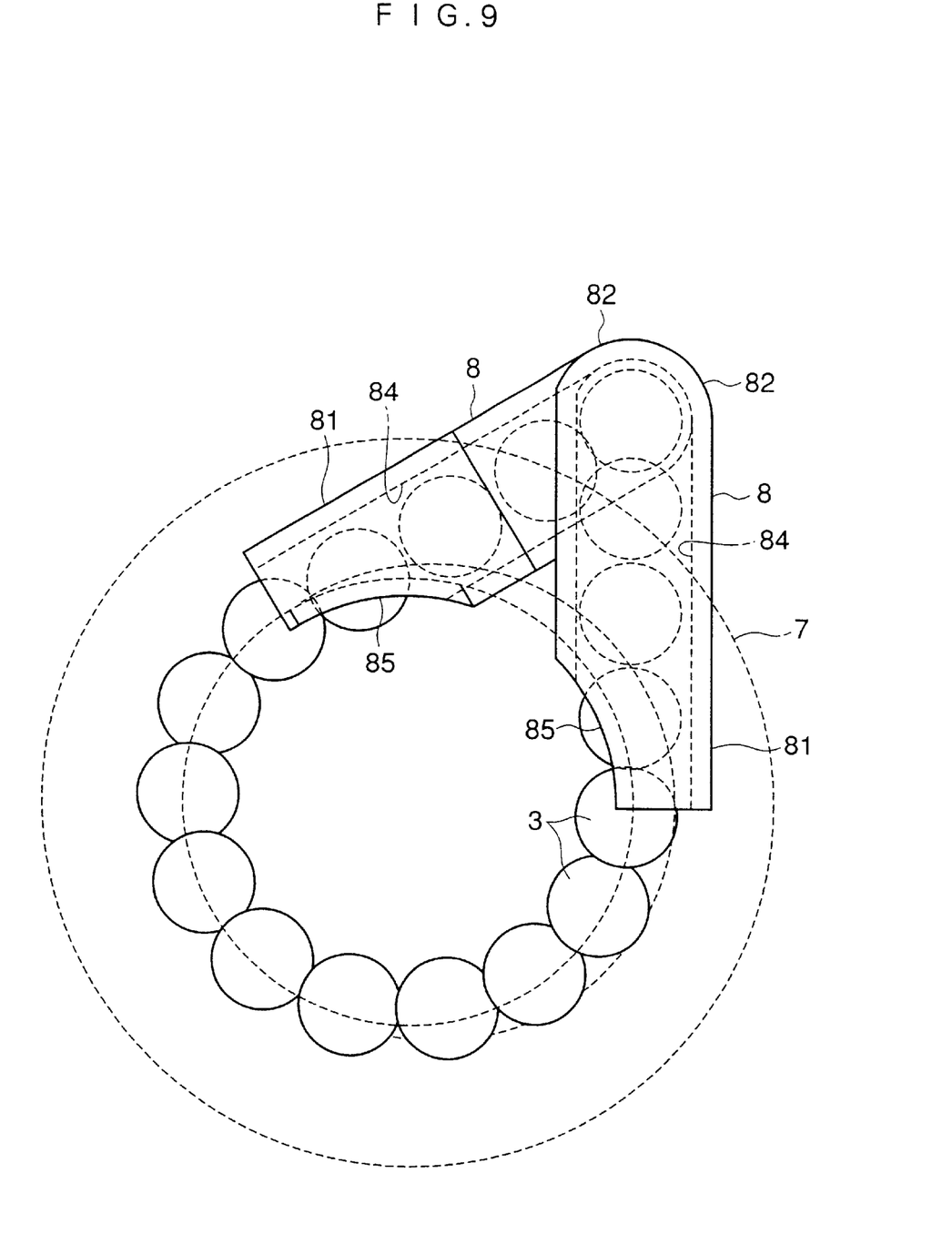
FIG. 9 shows the circulating condition of balls in the ball screw of the second embodiment.

The nut member 7 is provided with ball passing holes 71 extending through inner and outer circumferential surfaces thereof, and return pieces 80 are positioned on the nut member 7 by inserting the leg portions 81 of the former into these ball passing holes 71 of the latter. FIG. 9 is a sectional view showing the condition of the formation of an endless circulating passage for the balls 3. Each of the return pieces 80 is formed rectangularly in external appearance so that the return piece is positioned easily with respect to the nut member 7 and fitted in the relative ball passing hole 71 of the nut member 7 without causing a clearance to occur therebetween. When the return piece 80 is fitted into the ball passing hole 71 of the nut member 7, parts thereof ought to project from the inner circumferential surface of the through hole 70 of the nut member 7 toward the screw shaft 1. End portions thus projecting are cut off arcuately so that the end portions do not interfere with the screw shaft 1, and the cut portions form scoop portions 85 which are adapted to guide the balls 3, which roll in the ball rolling groove 10 of the screw shaft 1, to the interior of the return passage 84 in the same manner as in the return piece 50 of the first embodiment. The return passage 84 formed in the return piece 80 extends tangentially with respect to the loaded rolling groove of the nut member 7 so that the balls 3 rolling in the loaded rolling groove can smoothly enter the return passage 84.

Figure 10:
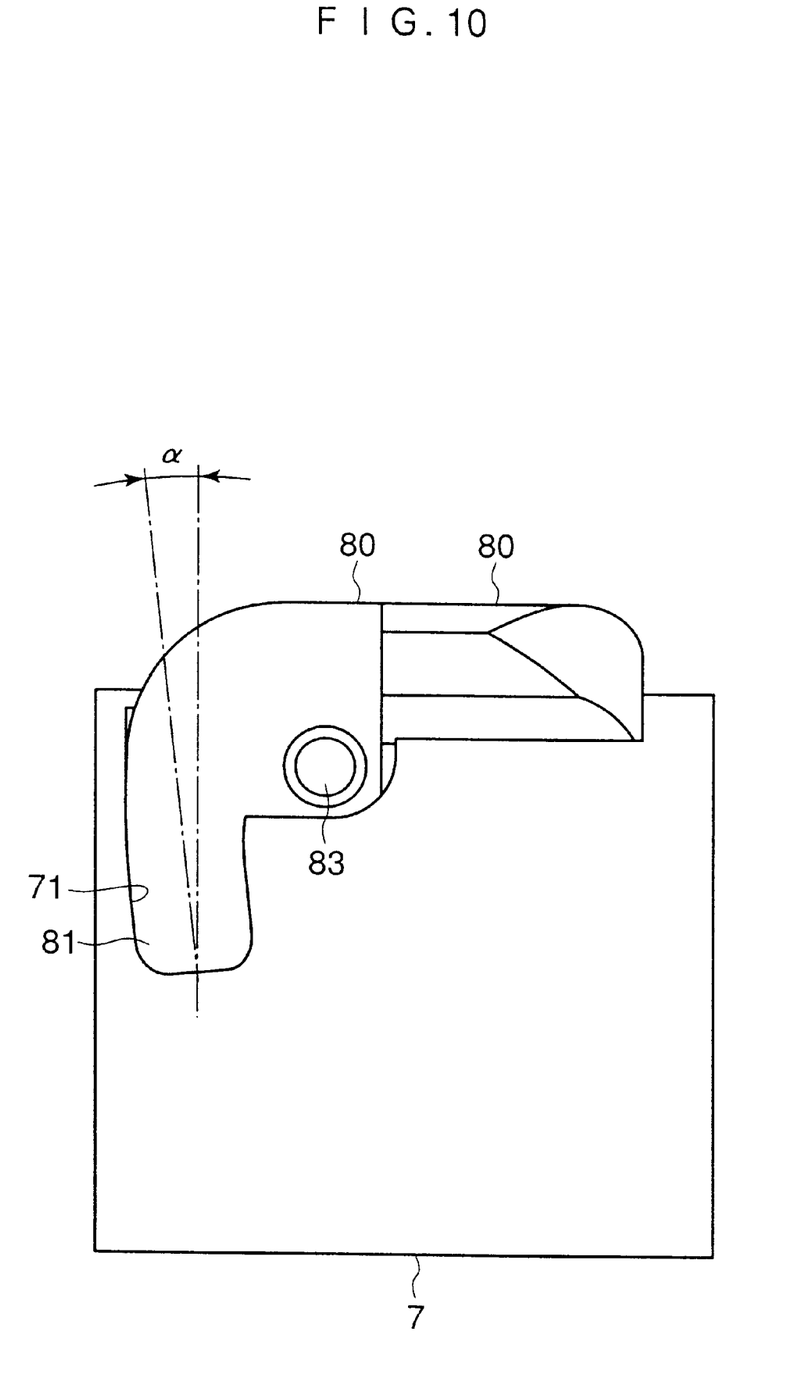
FIG. 10 is a side view showing how to fix the return piece to a nut member.

As shown in FIG. 10, an inner surface of the ball passing hole 71 is inclined at an angle equal to a lead angle $\alpha$ of the loaded rolling groove so that the return piece 80 can be inserted into the ball passing hole 71 in the direction inclined at an angle equal to the lead angle $\alpha$. Therefore, the inner surface of the ball passing hole 71 is formed so that the return piece 80 is positioned with respect to the axial direction of the nut member 7. This enables the return piece 80 to be positioned accurately with respect to the nut member 7, and the scoop portions 85 of the return piece 80 and the loaded rolling groove of the nut member 7 to be opposed to each other accurately.

In the ball screw according to the present invention thus formed, the return piece 80 constituting the return pipe 8 is also inserted into the ball passing hole 71 of the nut member 7 in the direction inclined at an angle equal to the lead angle $\alpha$ of the ball rolling groove 10. Therefore, the ball passing hole 71 has only to be formed to a size equal to that of the leg portion 81 of the return piece 80. This enables the return piece 80 to be positioned accurately by only fitting the return piece 80 into the ball passing hole 71. Even when the diameter of the balls 3 rolling in the loaded rolling groove of the nut member 7 is large, the interfering of the ball passing hole 71 with an adjacent portion of the loaded rolling groove by a distance corresponding to one turn thereof does not occur. Even when a lead length of the ball rolling groove 10 is small with the diameter of the balls 3 large, an endless circulating passage for the balls 3 can be formed by a return pipe system.

Figure 11:
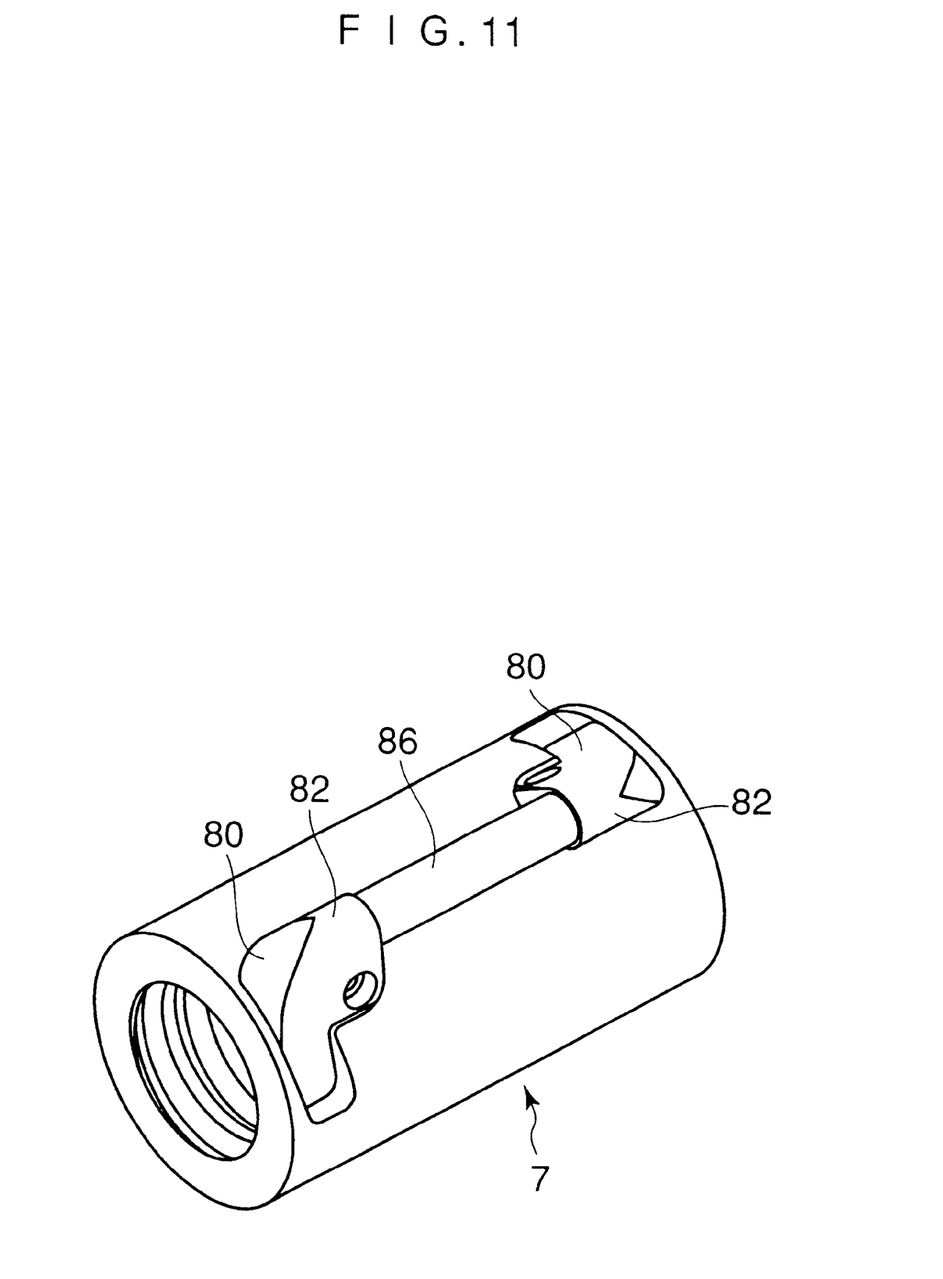
FIG. 11 is a perspective view showing an example of a communication passage piece interposed between a pair of return pieces in the second embodiment.

The ball screw of the second embodiment can also be formed so that a linear communication passage piece 86 is interposed between head portions 82 of a pair of return pieces 80 as shown in FIG. 11. When the ball screw is formed in this manner, the number of turns of a loaded rolling groove included in an endless ball circulating passage can be increased, and a load capacity of the ball screw can be improved.

Figure 12:
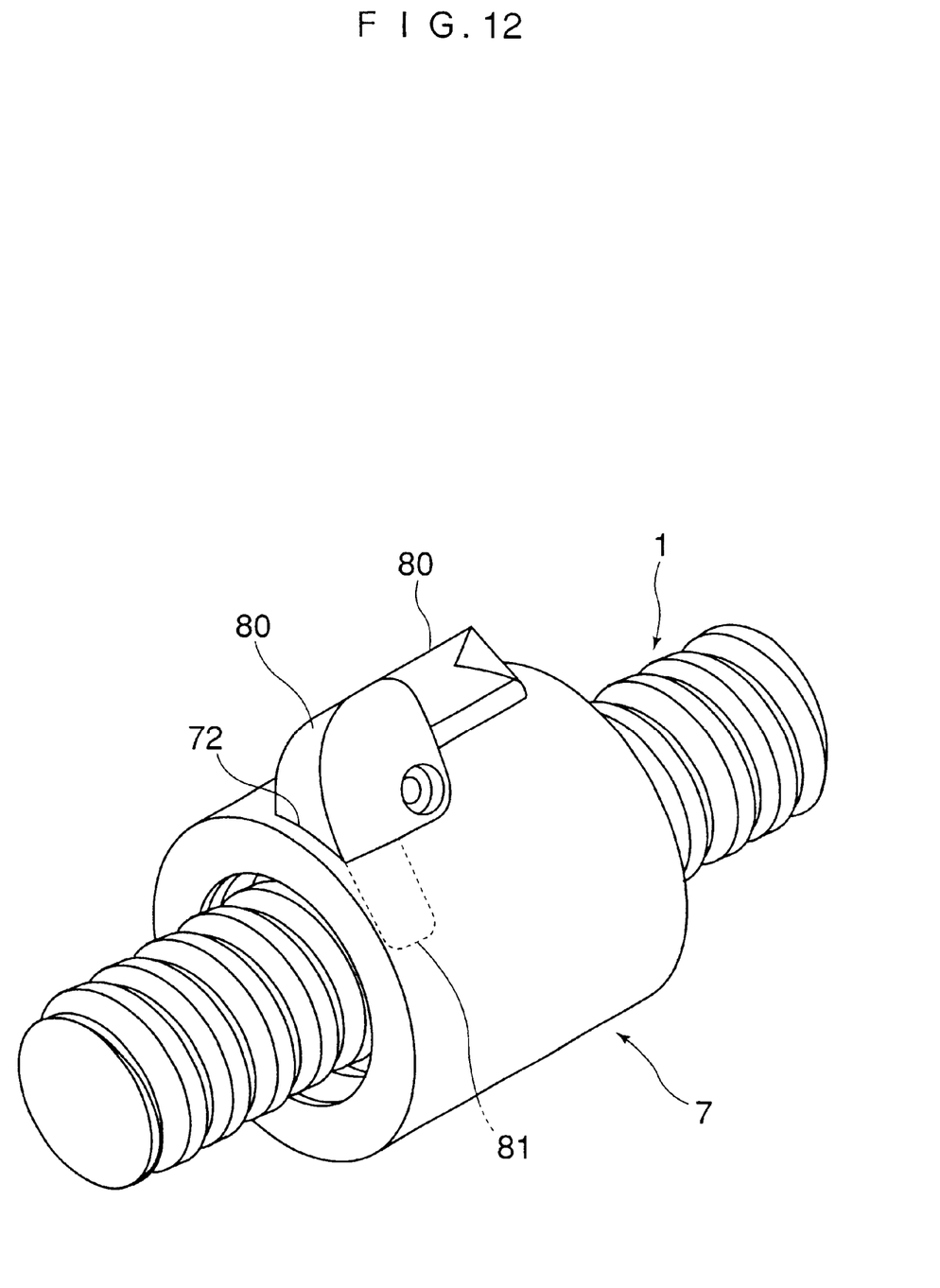
FIG. 12 is a perspective view showing a modified example of the ball screw of the second embodiment.

In the nut members shown in the first and second embodiments, the forming of the ball passing holes 20, 71 therein and the fitting of the return pieces in these ball passing holes are done easily. Accordingly, the ball passing holes 20, 71 are formed by cutting out the nut members 2, 7 in the circumferential direction thereof. According to the present invention, providing a nut member with ball passing holes of substantially such dimensions that enable return pieces to be inserted thereinto in the tangential direction of a loaded rolling groove serves the purpose. For example, as shown in FIG. 12, it is possible to form a ball passing hole 72, in which a leg portion 81 of a return piece 80 is fitted without causing a clearance to occur between the hole and return piece, in a nut member 7, and completely close the ball passing hole 72 with the leg portion 81 of the return piece 80.

Figure 13:
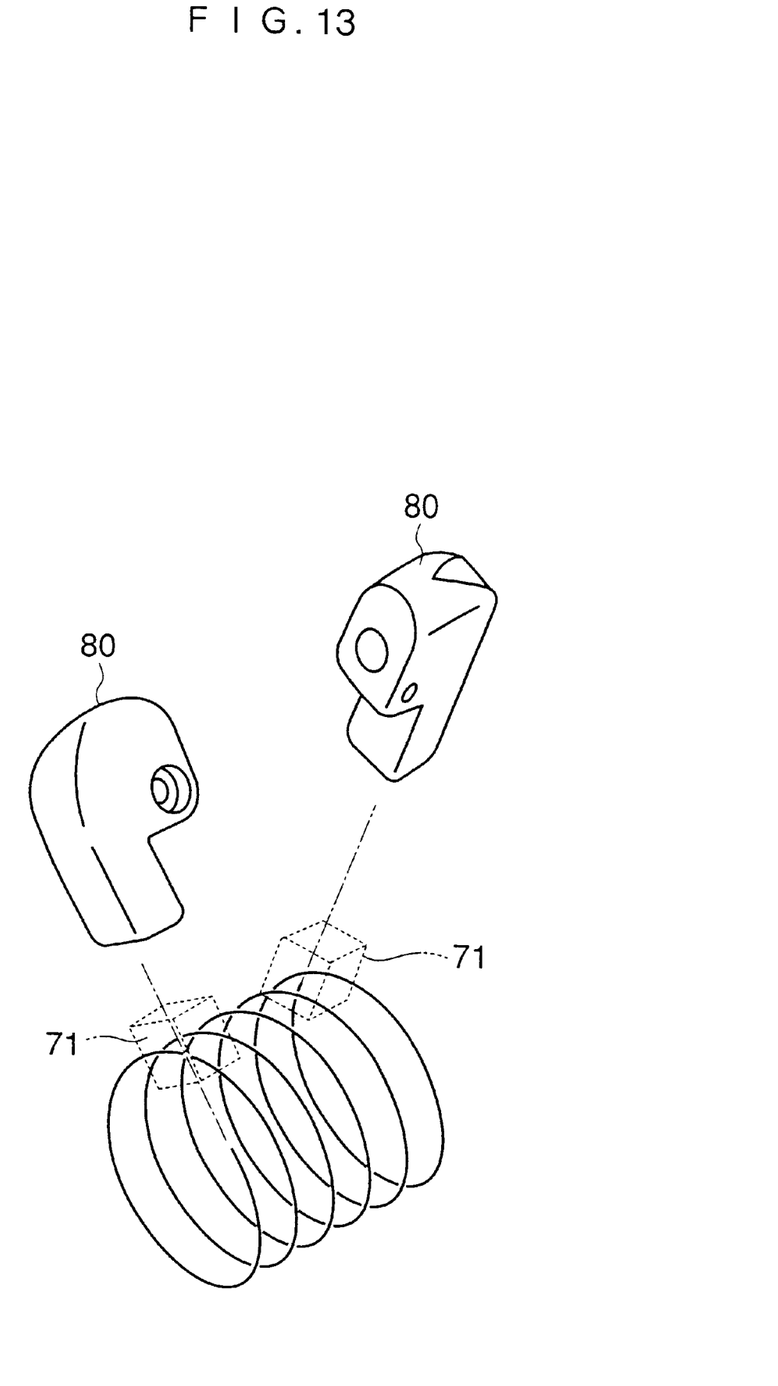
FIG. 13 is a schematic diagram showing the positional relation between ball passing holes and a loaded rolling groove in the present invention.

Namely, according to the present invention, as shown in FIG. 13, the ball passing holes 71 extend through the nut member in the radial direction of the helical loaded rolling groove. The return pieces 80 may be fitted in the ball passing holes 71 thus formed.

The ball passing holes 20, 71 can be formed simply with a high accuracy by cutting out the nut members 2, 7 in the circumferential direction thereof as in the above-described embodiments by utilizing a milling process, and a ball screw capable of circulating balls smoothly can be manufactured at a lower cost.

What is claimed is:

1. A ball screw comprising:
   a screw shaft provided with a helical ball rolling groove having a predetermined lead angle,
   a nut member having a through hole through which the screw shaft is passed, and a helical loaded rolling groove formed in an inner circumferential surface of the through hole, opposed to the ball rolling groove and engaged with the screw shaft via plural balls rolling in the ball rolling groove and loaded rolling groove,
   a pair of ball passing holes formed between an outer circumferential surface of the nut member and the inner circumferential surface of the through hole, each of which is joined to opposed side portions of the loaded rolling groove, and
   a return pipe having a pair of leg portions inserted into relative pair of ball passing holes, and fixed to the nut member so as to form an endless ball circulating passage,
   wherein an axis of the ball passing holes are formed so as to incline from cross sections thereof which are perpendicular to an axis of the screw shaft in an axial direction of the screw shaft by an angle equal to a lead angle of the ball rolling groove of the screw shaft, and
   the return pipe has at least a pair of return pieces, one of the return pieces including one of said leg portions which is inserted into one of the ball passing holes in a direction inclined at an angle equal to the lead angle and fitted in the ball passing holes without causing a clearance to occur therebetween.

2. A ball screw according to claim 1, wherein the return pieces are inserted into the ball passing holes and thereby positioned with respect to the loaded rolling groove.

3. A ball screw according to claim 1, wherein each of the return pieces has a communication passage piece for connecting a pair of return pieces together on an outer side of the nut member.

4. A ball screw according to claim 1, wherein the ball passing holes are formed by cutting out the nut member in a circumferential direction thereof.

5. A ball screw according to claim 1, wherein the two return pieces constituting the return pipe are separately positioned on and fixed to the nut member.

* * * * *